United States Patent [19]
de Putter

[11] 3,728,059
[45] Apr. 17, 1973

[54] APPARATUS FOR DEFORMING A PLASTIC PIPE

[75] Inventor: Warner Jan de Putter, Zwolle, Netherlands

[73] Assignee: Industriele Anderneming Wavin N.V., Zwolle, Netherlands

[22] Filed: Aug. 31, 1970

[21] Appl. No.: 68,328

[30] Foreign Application Priority Data

Sept. 4, 1969 Netherlands ..................6913490

[52] U.S. Cl. .............425/155, 425/393, 264/312, 72/117, 72/123
[51] Int. Cl. ...........................................B29c 17/00
[58] Field of Search .................18/19 TE, 19 TM, 18/19 TC; 264/312; 72/85, 115, 122, 123, 124, 316, 117; 425/392, 393, 155, 156, 160

[56] References Cited

UNITED STATES PATENTS

| 729,099 | 5/1903 | Smith | 18/19 TE |
|---|---|---|---|
| 2,835,309 | 5/1958 | Wallace | 18/19 TE |
| 3,484,900 | 12/1969 | Sands et al. | 18/19 TM |
| 2,583,297 | 1/1952 | Kegan | 425/160 X |

*Primary Examiner*—Robert L. Spicer, Jr.
*Attorney*—James E. Nilles

[57] ABSTRACT

Apparatus and method for providing a thermoplastic pipe with an inner groove, by subjecting a heat plasticized pipe to the action of some rotatably supported rollers which are expanded and rotated by means of a mandril. The assembly of all rollers is caused to move along the inner wall of the plastic pipe in a plane perpendicular to the axis of the pipe.

5 Claims, 1 Drawing Figure

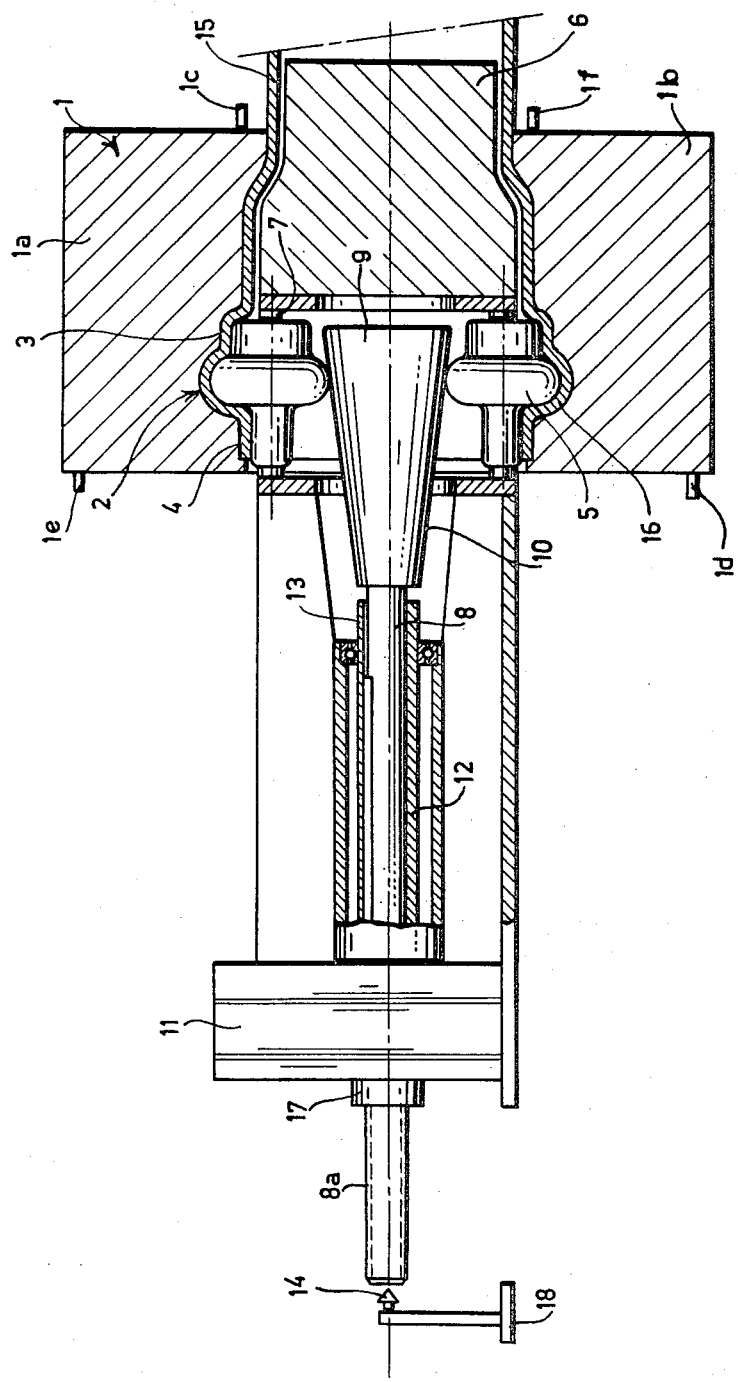

APPARATUS FOR DEFORMING A PLASTIC PIPE

My invention relates to a method for deforming a plastic pipe whilst providing at least one or more grooves, consisting in that around the pipe part to be deformed a divided hollow die is provided having on its inner side an annular cavity which corresponds to the inner shape of the finished groove in the tube to be deformed, and in that radially expansible deforming means are disposed within the pipe to be deformed, the pipe part to be deformed is brought into a state facilitating the formation of the groove and the deforming means are outwards moved whilst expanding the plastic pipe so that the latter is adapted to the inner wall of the die, whereupon the pipe is cooled until same is no longer permanently deformable and the hollow die is removed.

According to the known method, however, an inflatable ring is applied as a deforming means which by the aid of a conical core is expanded in such a way that the plastic pipe is adapted to the cavity in the hollow die, whilst forming the desired groove in the plastic pipe. The elastomer used for this deforming ring is however not suitable for the manufacture of a plastic pipe with an inner groove which satisfies very close tolerances.

To a decreasing extent however, the ends of these pipes and the grooves provided therein should satisfy very close tolerances, especially when pipes with a large diameter are used.

It is now an object of the invention to provide a method whereby the end of a pipe can be deformed and provided with an inner groove whilst observing very close tolerances.

This object is attained according to the invention in the way that from the start of the deformation the radially expansible rotatable deforming means are kept in rotation along the pipe wall until the pipe has obtained a temperature at which only the normal shrunkage caused by the linear coefficient of expansion will be observed.

The invention will be clarified with reference to the drawing in which a section through an embodiment of the invention is represented.

The device according to the invention comprises a hollow die 1 consisting of two halves of die 1a and 1b. The halves of die 1a and 1b have on the inner side an annular cavity 2, while moreover besides this annular cavity 2 further recesses 3 and 4 are provided in the inner wall of the die. The halves of die are provided with an inlet 1c, 1d and an outlet 1e and 1f for introducing a cooling or heating medium.

The device comprises further radially expansible deforming means 5 in the shape of moulding rollers. These moulding rollers 5 are resiliently secured in a widening pin 6, the rollers, due to the action of a closed spring 7 being drawn, however, in the direction of the axis of the device.

These moulding rollers 5 have a profile which corresponds to the shape of the profile of the inner wall of the die 1 at the location of the recesses 3 and 4 and the annular groove 2.

The moving means 9 for radially moving outwards the deforming means 5 consist of a conical mandril 9 which through the shaft 8 can be moved in a longitudinal direciton by driving means 17. These driving means 17 comprise e.g., a gear wheel which cooperates with screw thread 8a provided on the shaft 8 which shaft with a sliding key way 13 is secured in a sleeve 12.

Through rotative means 11 in the shape of a gear box driven by an engine the shaft 8 and the mandril 9 connected therewith will be rotated. Due to this rotation the moulding rollers 5 cooperating with the wall 10 of the conical mandril 9 and the widening pin 6 will be rotated, too.

It will be obvious that pin 6 may consist of two parts, viz. a fixed part and a free rotatable part supported by mandril 9.

For the delimitation of the movement of the shaft 8 and consequently of the mandril 9 in the longitudinal direction the device is provided with a delimiting member in the shape of a micro switch 14 which ensures that the driving means 17 for the shaft is switched off, however, not the rotative means 11 for the rotary motion.

In order to stop the rotative means 11 the device is provided with time regulating means in the shape of a time clock 18 which acts upon the rotative means 11 by ending the electric feeding of the rotative means.

The speed of the movement in the longitudinal direction can be obtained by changing the gear wheels and the screw thread on the shaft.

For the provision of a groove at the end of a plastic pipe 15 one proceeds as follows.

After the rollers 5 are at the smallest possible distance of the shaft a plasticized plastic PVC pipe of 190°C is slid over the rollers. Before sliding the pipe over the rollers 5 and widening 6 the pipe is widened such that pin 6 can freely rotate in the pipe. Thereupon two halves of die 1a, 1b are provided around that end. It is obvious that also the plastic pipe can be plasticized, by heating, in the die.

Thereupon the driving means 17 and rotative means 11 are set into motion e.g., by a motor (not shown), whereby the shaft 8 with the mandril 9 starts to rotate and the mandril 9 is also moved in the longitudinal direction by moving the moulding rollers 5 radially outwards. Due to the movement of the mandril 9 the widening pin part 6 will be rotated, too.

During this movement the moulding rollers 5 rotate and a groove 16 is produced in the widened out end because the plastic pipe contacts the walls of the recesses 2, 3 and 4 of the die.

As soon as the end of the shaft 8 reaches the micro switch 14 the longitudinal movement of the shaft 8 is ended and only the mandril is rotated due to the effect of the rotative means 11, whereby simultaneously the cooling of the die is started by introducing cold water via 1c and 1d. The time clock 18 is adjusted in such a way that the rotative means 11 are effective until the plastic pipe has reached a temperature at which no lasting deformation but exclusively the normal shrunkage caused by the linear coefficient of expansion can be produced e.g., a temperature below 90°C and preferably below 70°C for PVC tubes. The adjustment of the time clock will depend on many factors such as wall thickness, composition of the plastic and so on.

Hereupon the parts 1a, 1b of the die are removed from each other and the pipe can be removed after the rollers 5 due to the displacement of the mandril 9 as assumed a position which is as close as possible to the shaft.

It is obvious that besides the provision of the grooves also a deformation already effected can be exactly calibrated during the action of the moulding rollers 5.

The moulding rollers 5 can be profiled in such a way that the entire widened out part of the pipe is produced at the same time with the formation of the groove.

Finally the starting point may be a pipe part with a thickened end, or, after the formation of the groove, the end of the pipe can be thickened or previously the end of the pipe be provided with a sleeve.

It should be noted that it is not necessary to plasticize the plastic pipe before rotation of the rollers, as the heat produced by the friction of the rotating rollers will also contribute to a temperature increase of the pipe facilitating the formation of the groove.

I claim:

1. A device for providing a heated plastic pipe with at least one groove comprising at least one divided hollow die having on its inner side an annular cavity which corresponds to the outer shape of the finished groove in the finished pipe, radially expandable and resiliently movable deforming means, conically shaped moving means axially movable to effect outward radial movement of said deforming means and being rotatable to effect rotary movement of said deforming means, adjustable time regulating means responsive to extreme outward radial positioning of said deforming means to stop radial movement of said deforming means while maintaining rotary movement thereof, and means for cooling said pipe while said radial movement of said deforming means is stopped and while said rotary motion continues.

2. A device according to claim 1 including driving means to effect axial movement of said moving means and rotative means to effect rotary movement of said moving means, wherein said deforming means are rollers, and wherein said moving means comprises a conical mandril connected to a threaded shaft, said shaft being cooperable with said driving means and said rotative means.

3. A device according to claim 2 wherein said adjustable time regulating means includes switch means responsive to the axial position of said shaft when said rollers are in extreme outward radial position to render said drive means ineffective to move said shaft and to maintain said rotative means operative.

4. A device according to claim 3 including cooling means for cooling said die and wherein said switch means also affects operation of said cooling means.

5. A device according to claim 4 wherein said adjustable time regulating means maintain said rotative means operative until said plastic pipe is cooled to a predetermined temperature.

* * * * *